May 28, 1957  C. S. BURTCHAELL  2,793,566

MOUNTING STRIP FOR MIRRORS

Filed Oct. 4, 1954

INVENTOR
CLARENCE S. BURTCHAELL
BY Charles S. Evans his ATTORNEY

United States Patent Office 2,793,566
Patented May 28, 1957

---

2,793,566

MOUNTING STRIP FOR MIRRORS

Clarence S. Burtchaell, Ross, Calif.

Application October 4, 1954, Serial No. 460,217

1 Claim. (Cl. 88—96)

My invention relates to a mounting strip and particularly to means for mounting a mirror in the cover of a lady's vanity case.

One of the objects of the invention is the provision of a mounting strip which is easy and quick to apply, holds the mirror securely, and presents a neat and attractive appearance as a frame for the mirror.

These and other objects of my invention will appear in the following description of my invention. I do not limit myself to the exact embodiment of my invention shown and described, but may adopt various forms within the scope of the appended claims.

Referring to the drawings.

Figure 1:
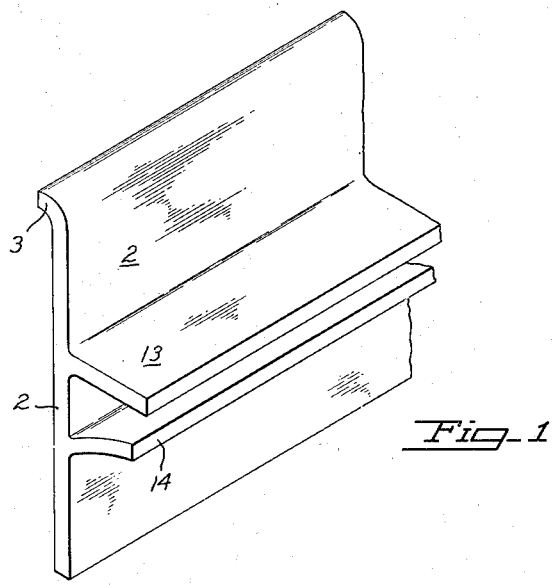
Fig. 1 is a perspective view of a short section of my mounting strip drawn to an enlarged scale.

Broadly my mounting strip is made from a suitable plastic and comprises a main or body portion, generally flat but having one edge curled over to form a bead lying snugly against the side and end walls of the case cover when the strip is secured thereto. Midway in the width of the strip are two spaced flanges of uneven width between which the edge of the mirror lies. The wider of these flanges extends at a right angle to the strip body and lies flat against the outer face of the mirror to form with the beaded margin an attractive frame for the mirror.

The narrower or retaining flange which is concealed by the mirror extends from the main body in a curve so as to exert a resilient pressure against the under side of the mirror to retain it firmly against the outer or frame flange. This shorter flange engages the silvered side of the mirror, nearer its edge and any damage to the silver by contact with the flange is therefore concealed by the frame flange.

The strip is formed by extruding a selected plastic from suitable dies; and when it is cut to length with mitered corners, it is assembled on the mirror, the assembly dropped into place in the cover, and then secured by short brads driven in below the bead.

In greater detail and referring to the drawing, my mounting device comprises a generally flat strip 2, having its upper edge curled over into a narrow flange 3.

Figure 2:
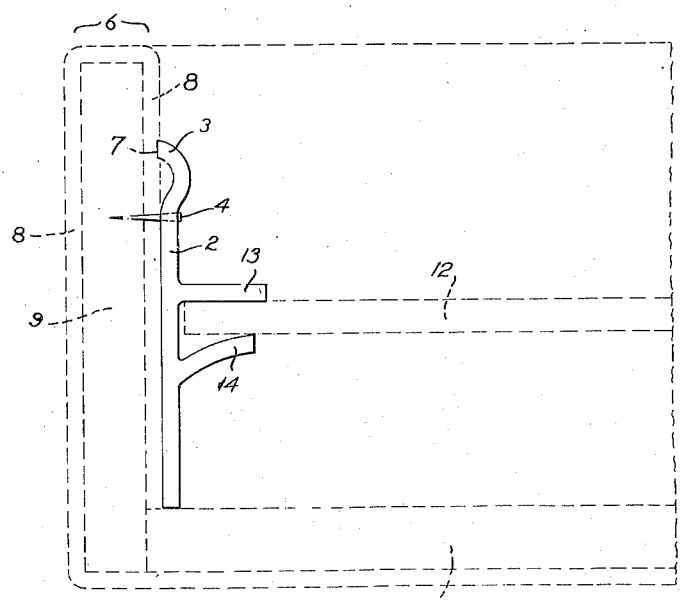
Fig. 2 is a sectional view on an enlarged scale and showing the mounting strip attached in position of use within the cover of a vanity case, which is shown in dash lines.

When the strip is cut into suitable lengths and fastened by brads 4 flat against the inside face of the vanity case cover 6, the flange 3 is resiliently deformed into a bead as shown in Fig. 2, the edge 7 of the bead pressing tightly against the cloth or leather lining 8, which usually covers both inside and outside surfaces of the core structure 9 of the case cover.

Before the mounting strip is applied, it is cut to suitable lengths with mitered corners, and assembled on the mirror 12, which fits snugly between the two flanges 13 and 14. The assembly is then dropped into place and nailed. The upper flange 13 together with the upper or beaded portion of the flat body forms an attractive frame for the mirror, the flange extending from the body at right angles and lying flat against the glass, and the bead 3 biting into the soft lining.

The lower flange 14 is narrower than the upper or frame flange and curves toward the upper flange so that its edge resiliently engages the silvered side of the mirror and holds it resiliently against the under side of the frame flange 13.

Because long use might cause enough lateral movement between silver backing and flange to damage the backing at the point of contact, the lower or retaining flange is shorter than the overlying frame flange 13, so that such damage, if it occurs is hidden from view.

I claim:

A mounting structure for mounting a flat plate type mirror in a lady's vanity case comprising a generally flat and rigid strip with a back and a front and having intermediate its long edges a pair of spaced flanges, the first flange extending at right angles to the front of the strip and forming with an adjacent face portion of the strip a frame adapted to receive an edge of said flat plate type mirror, the second said flange extending from the strip in a curved manner toward said first flange so that its unsupported outer end is in spaced relation to said first flange a distance less than the thickness of said mirror when in unsupporting condition, said second flange being adapted to be sprung away at its outer end from said first flange to receive the flat plate type mirror between it and said first flange and when released having gripping engagement with said mirror, said flanges extending integrally from the face of said strip at a position so as to leave a marginal portion of said strip with one of the long edges of the strip forming a part of said portion adjacent at least one side of the flanges, said marginal portion having a width approximately equal to the length of said flanges, said marginal portion of the strip having a third flange resiliently deformed into a bead projecting to the same side of said strip as said first and second flanges, the adjacent longitudinal edge of said strip forming the terminal portion of said third flange and extending beyond a plane containing said back of the strip whereby said terminal portion is adapted to bite into the lining of a vanity case when said strip is installed therein.

References Cited in the file of this patent

UNITED STATES PATENTS

| 1,375,104 | Person | Apr. 19, 1921 |
| 1,605,006 | Simpson | Nov. 2, 1926 |
| 1,857,602 | Obst | May 10, 1932 |
| 2,531,967 | Bishop | Nov. 28, 1950 |